Dec. 26, 1922.
L. F. BIRD.
FLEXIBLE MOUNTING MEANS.
FILED JAN. 26, 1921.
1,439,996
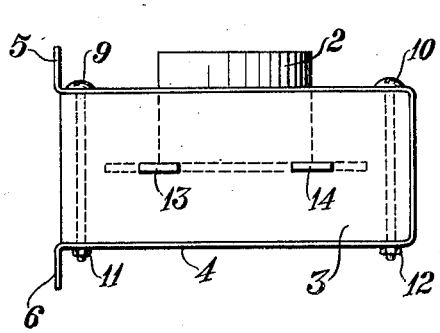
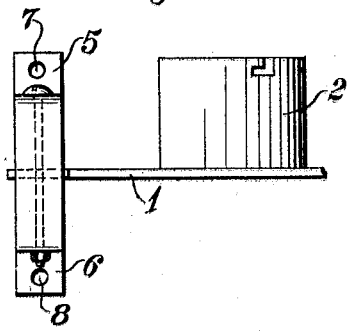
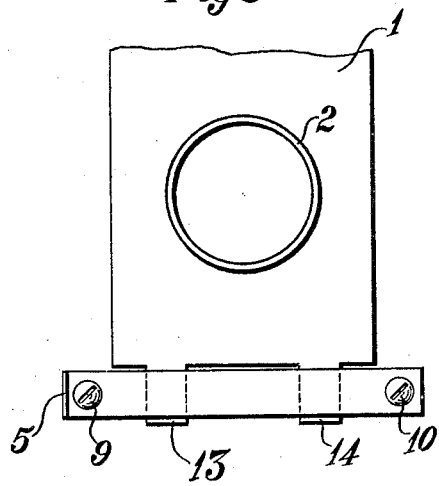
Lester F. Bird
Inventor
By Robert H. Young
Attorney Patented Dec. 26, 1922.

1,439,996

UNITED STATES PATENT OFFICE.

LESTER F. BIRD, OF SEATTLE, WASHINGTON.

FLEXIBLE MOUNTING MEANS.

Application filed January 26, 1921. Serial No. 440,122.

*To all whom it may concern:*

Be it known that I, LESTER F. BIRD, citizen of the United States, residing at Seattle, in the county of King and State of Washington, have invented certain new and useful Improvements in Flexible Mounting Means, of which the following is a specification.

This invention relates to flexible mounting for vacuum tubes or the like.

An object of this invention is to provide flexible mounting means for vacuum tubes, electric lamps and other devices of delicate or fragile construction which are subject in use to vibration, whereby such device is protected from blows or breakage and the vibrations transmitted to the device minimized.

As a preferred form of my invention, say for use of vacuum tubes in radio transmitting and receiving apparatus, I provide a piece of sponge rubber of determined dimensions, a base of rubber fibre or other suitable, relatively rigid and insulating material, secured to such sponge rubber whereby the vacuum tube is supported in proper position and mechanically insulated from vibrations to which the support of the sponge rubber may be subjected. Such construction affords also protection to the vacuum tube in the event that blows may be imparted to the vacuum device during its use.

Further features and objects of the invention will be more fully understood from the following description and accompanying drawings, in which—

Fig. 1 is a rear elevation of one form of my invention;

Fig. 2 is a side elevation of the same; and

Fig. 3 is a top plan view.

Referring to the drawings, the particular embodiment of the invention is especially useful for mounting vacuum tubes of radio transmitting or receiving sets, and for such purpose the base 1 is provided, on which is secured the socket 2, for receiving the vacuum tube. The base 1 is preferably of rubber fibre composition or of other suitable insulating material and the socket 2 may be of the same material or may be of similar material or may be integral therewith.

Such block 3 of sponge rubber is mounted within a metal bracket 4 or like rigid support to effect certain results described more fully hereinafter.

In the specific embodiment illustrated, the bracket 4 is of substantially rectangular contour.

The bracket 4 is provided with end flanges 5, 6, respectively having recesses 7, 8, through which screws or bolts pass for securing the bracket 4 to the board of the radio set or other suitable support.

The block 3 of sponge rubber is retained within the bracket 4 by means of the bolts 9, 10, which pass through openings in the upper length of the bracket and similar openings in the lower length of the bracket and tightened by means of the nuts 11, 12, whereby the degree of contact of the bracket 4 with the block of rubber and the degree of compression of the block of rubber is adjusted.

A mode of securing the base 1 to the block 3 attains the result of firmly supporting the vacuum tube during normal use and at the same time effectually precluding the transmission of vibrations or jars to which the board of the radio set or other support for the bracket may be subjected. As one form of such mode of attachment, the base 1 is provided with the rear extensions 13, 14, and the block 3 of sponge rubber slitted to receive such extensions 13, 14 and preferably to permit such extensions to project beyond the rear face of the block 3, as is indicated in Fig. 3. Thus, upon assembling the base in its support, the projections 13, 14 are passed into and through the slits in the block 3 of sponge rubber, whereafter the nuts 11, 12 of the bolts 9, 10, are tightened to compress the block 3 of sponge rubber and firmly retain the extensions 13, 14 in place.

In a similar manner, my invention is applicable for mounting electric lamps where it is desired to protect such lamps from similar disturbances or from breakage, and the principle of my invention is applicable for mounting similar devices whether of electrical or other nature.

Whereas I have described my invention by reference to specific forms thereof, it will be understood that many changes and modifications may be made without departing from the spirit of the invention, as defined by the appended claim.

I claim:

A support for vacuum tubes of radio sets comprising a supporting element of substantially quadri-lateral contour, a block of sponge rubber positioned within said supporting element, a base having spaced extensions received within said block of sponge rubber, a socket for the vacuum tube carried by said base and bolts passing from opposite sides of said supporting element through said block of sponge rubber.

In testimony whereof I have affixed my signature.

LESTER F. BIRD.